United States Patent [19]

Donuiff et al.

[11] Patent Number: 4,870,111
[45] Date of Patent: Sep. 26, 1989

[54] MOLDABLE SILANE-CROSSLINKED POLYOLEFIN FOAM BEADS

[75] Inventors: Thomas M. Donuiff, Saratoga Springs; Frederick H. Collins, Glens Falls, both of N.Y.

[73] Assignee: Astro-Valcour, Incorporated, Glens Falls, N.Y.

[21] Appl. No.: 73,642

[22] Filed: Jul. 15, 1987

Related U.S. Application Data

[62] Division of Ser. No. 17,674, Feb. 24, 1987, Pat. No. 4,702,868.

[51] Int. Cl.$^4$ ............................ C08V 9/22; C08V 9/24
[52] U.S. Cl. .......................................... 521/60; 521/56; 521/79; 521/81; 521/91; 521/134; 521/143; 521/154
[58] Field of Search .................. 521/29, 81, 91, 134, 521/143, 154, 56, 60

[56] References Cited

U.S. PATENT DOCUMENTS

| | | | |
|---|---|---|---|
| 2,787,809 | 4/1957 | Stastny | 18/48 |
| 3,250,730 | 5/1966 | Palmer | 260/2.5 |
| 3,278,658 | 10/1966 | Immel | 264/51 |
| 3,413,244 | 11/1968 | Landler et al. | 260/2.5 |
| 3,646,155 | 2/1972 | Scott et al. | 260/827 |
| 3,646,166 | 2/1972 | Canter et al. | 260/879 |
| 3,953,355 | 8/1976 | Hatano et al. | 264/22 |
| 3,992,501 | 11/1976 | Tatzel et al. | 264/126 |
| 4,032,609 | 6/1977 | Smith | 264/53 |
| 4,117,195 | 9/1978 | Swarbrick et al. | 428/379 |
| 4,160,072 | 7/1979 | Shimkai et al. | 521/143 |
| 4,168,353 | 9/1979 | Kitamori | 521/59 |
| 4,252,906 | 2/1981 | Hosokawa et al. | 521/143 |
| 4,278,628 | 7/1981 | Montgomery et al. | 264/45.5 |
| 4,333,898 | 6/1982 | Schmidtschen | 521/79 |
| 4,413,066 | 11/1983 | Isaka et al. | 525/326.5 |
| 4,424,180 | 1/1984 | Lalloz et al. | 264/51 |
| 4,440,703 | 4/1984 | Akiyama et al. | 264/50 |
| 4,446,254 | 5/1984 | Nakae et al. | 521/134 |
| 4,456,704 | 6/1984 | Fukumura et al. | 521/79 |
| 4,456,704 | 6/1984 | Fukumura et al. | 521/79 |
| 4,464,425 | 8/1984 | Vogt et al. | |
| 4,483,809 | 11/1984 | Ando et al. | 264/53 |
| 4,519,963 | 5/1985 | Yoshida et al. | |
| 4,526,930 | 7/1985 | Keogh | 525/105 |
| 4,554,293 | 11/1985 | Park | 521/81 |
| 4,558,094 | 12/1985 | Deguchi et al. | 525/71 |
| 4,596,833 | 6/1986 | Endo et al. | 521/143 |
| 4,602,047 | 7/1986 | Endo et al. | 521/58 |
| 4,656,197 | 4/1987 | Yoshimura et al. | 521/56 |
| 4,762,860 | 8/1988 | Park | 521/143 |

FOREIGN PATENT DOCUMENTS

| | | |
|---|---|---|
| 0142724 | 5/1985 | European Pat. Off. . |
| 8501944 | 9/1985 | PCT Int'l Appl. . |
| 1286460 | 8/1972 | United Kingdom . |
| 1408154 | 10/1975 | United Kingdom . |

OTHER PUBLICATIONS

Chemical Abstracts, vol. 101, 1984, p. 38, (Columbus, Ohio, U.S.), JP, A, 5951925 (Chisso Corp.) Mar. 26, 1984.
Kirk-Othmer *Encyclopedia of Chemical Technology* (3rd Edition) vol. 16, pp. 385-420.
*Modern Plastics Encyclopedia* (1986-87 Edition) pp. 52-62.
*Encyclopedia of Polymer Science & Technology*, vol. 7, p. 610.

*Primary Examiner*—Morton Foelak
*Attorney, Agent, or Firm*—Fisher, Christen & Sabol

[57] ABSTRACT

Moldable foam beads comprising a silane-crosslinked polyolefin foam are produced by mixing a composition comprising a silane-modified polyolefin (such as a silane-grafted polyethylene) and a silanol condensation catalyst in an extruder to produce a melt, then injecting a blowing agent into the melt at a rate effective to produce a desired foam density in the extrudate; extruding and cutting the melt to form foam beads; and exposing the foam beads to moisture to produce silane crosslinking of the polyolefin foam.

20 Claims, No Drawings

MOLDABLE SILANE-CROSSLINKED POLYOLEFIN FOAM BEADS

This is a division of application Ser. No. 017,764, filed Feb. 24, 1987, now U.S. Pat. No. 4,702,868.

BACKGROUND OF THE INVENTION

1. Field of the Invention

The present invention concerns moldable beds of foamed polyolefins, and particularly beads of crosslinked polyolefins.

2. Description of the Prior Art

Foamable polystyrene beads are relatively easy to obtain and mold. Polystyrene resin is impregnated with an expanding agent, usually pentane, either during polymerization or resin particles are impregnated after polymerization. These particles are then subjected to steam to partially expand them. The pre-expanded beads are then fed to a mold and subjected to pressurized steam where they further expand, fuse together, and conform to the shape of the mold. Such moldings are useful as decoration, insulation, and protective packaging; however, expanded polystyrene moldings suffer from many disadvantages. Polystyrene exhibits poor solvent resistance and high temperature stability and, therefore, moldings made from polystyrene cannot be used for many applications. Expanded polystyrene foam is generally brittle, fragile and possesses poor cushioning properties which limits its use as protective packaging for fragile items such as computers and other delicate instrumentation. In addition, polystyrene foam does not stand up well to repeated impacts; usually the cushioning ability of the molding is severely impaired after just one impact.

Foams molded from polyolefin beads overcome many of the drawbacks of polystyrene foam. Generally available polyolefin foam beads are polypropylene or crosslinked polyethylene. Both of these materials possess greater solvent resistance than polystyrene and are also more resistant to high temperature. Polyolefin foam is much more resilient and flexible than polystyrene foam and, therefore, is of much greater use for the packaging of fragile items. It maintains much of its cushioning effect after even many impacts and therefore lends itself for use as packaging for long distance transport or for re-useable packages.

In the case of polyethylene, a substantially crystalline polymer, the temperature range for good molding of foam beads is quite narrow. If the molding temperature is too low, poor fusion will result and the molding will not possess optimum tear resistance and large voids or unfused pockets could exist in the molding. If the molding temperature is too high, the plastic becomes too flowable and the structural integrity of the foam is destroyed, resulting in a collapsed, misshapen molding.

To give the polyethylene a greater resistance to temperature and to widen the temperature range for molding, polyethylene is crosslinked. This allows the foam to be molded using steam as the heat source without being destroyed. Moldable crosslinked polyethylene foam beads are presently manufactured in several ways. Polyethylene beads containing a chemical crosslinking agent, such as dicumyl peroxide, can be suspended in an aqueous solution and heated to the proper temperature to trigger the crosslinking reaction. Polyethylene resin can also be crosslinked by subjecting the particles to high energy radiation, such as X-rays or electron beams. The resultant crosslinked resin particles can then be impregnated with a hydrocarbon or chlorofluorocarbon blowing agent, such as butane, pentane, dichlorodifluoromethane, etc., by charging an aqueous suspension of the crosslinked polyethylene beads under pressure with the blowing agent. The solution is then heated and stirred in the autoclave to impregnate the beads with the blowing agent. Such processes are described in U.S. Pat. Nos. 4,399,087 and 4,436,840.

Because the blowing agent incorporated in the crosslinked polyethylene particles will readily dissipate, the expandable beads must either be stored under pressure or immediately pre-expanded, which is usually the case. The expansion ratio of these pre-expanded beads is usually between 10 and 45 to 1. Before molding, these beads are usually subjected to a pressurizing step where the beads are placed in a container which is charged with a pressurized gas, usually air or a chlorofluorocarbon/air mixture. Such processes are described in U.S. Pat. Nos. 4,399,087 and 4,443,393. This seep raises the pressure of the gas inside the cells of the foam beads above atmospheric pressure to impart additional expandability needed during molding. The beads must be molded soon after this step or the additional pressure inside the cells of the beads will be dissipated.

In another method, low density polyethylene resin and a hydrocarbon or chlorofluorocarbon blowing agent are melt mixed and extruded into strands which are cut into beads. These beads are then exposed to high energy radiation to crosslink the polymer structure and impart the thermal resistance needed to easily mold the particles. These beads require special molding apparatus as no additional expandability is incorporated into the beads prior to molding.

The first (chemical) method of crosslinked polyethylene bead manufacture is disadvantageous in that a relatively large and expensive autoclave-type reactor is needed for blowing agent impregnation. This is also a batch process where a certain quantity of the moldable crosslinked polyethylene beads are manufactured at once and then this entire quantity of beads must be treated and/or stored. This requires large storage facilities. In addition, these beads must be pressure treated prior to molding to impart additional expandability to the foam. This process requires substantial time, as the beads will be destroyed or damaged if the pressurizing step is carried out too quickly. Therefore, large pressure containers are needed to perform this operation economically.

Using the second (radiation) process discussed, the crosslinked beads can be made on a relatively inexpensive extruder equipped with the proper equipment for granulating the foamed extrudate. However, to crosslink the foam, a relatively expensive and cumbersome radiation source is required. Generally, it is not feasible to perform the crosslinking step in a number of manufacturing locations but the process lends itself to one or several rather large, central manufacturing facilities. High energy radiation does not easily or quickly penetrate into the foamed plastic structure. Therefore, the degree of crosslinking can be much less on the inside portions of the foamed beads than on the outsides, which could cause the beads to possess deficient thermal resistance.

U.S. Pat. No. 3,413,244 discloses a process for producing cellular polyolefin products in which a particulate unfoamed polyolefin is foamed within a mold and is simultaneously grafted and crosslinked by units of compounds containing two non-conjugated ethylenically-unsaturated double bonds.

International Application No. PCT/F184/00079, International Publication Number WO 85/01944, discloses foamed, silane-crosslinked polyolefin foam cable coverings which are described as relatively hard and rigid and are produced by extruding a mixture containing polyethylene, a silane hydrolyzable with water, a condensing catalyst and a foaming agent such as water.

U.S. Pat. No. 4,333,898 discloses a method for production of relatively high density foamed polymers (such as polyethylene) in which the polymer is mixed with a silane, which grafts thereto, then extruded to provide a jacket for a cable or the like, with a moist inert gas being injected into the extruder just prior to extrusion to cause the polymer to foam and the silane-grafted polymer to crosslink.

U.S. Pat. No. 4,456,704 discloses a method for producing crosslinked polyethylene foams which comprises mixing a polyolefin resin, a blowing agent, and optionally, a surface active agent, the polyolefin resin containing a crosslinkable ethylene polymer having on the side chains thereof silyl groups which effect crosslinking upon contact with water; extruding the mixture into a low pressure zone where the resulting extrudate, e.g., sheet, is allowed to expand, and bringing the expanded extrudate into contact with a silanol condensing catalyst so that the expanded extrudate is crosslinked upon contact with water.

None of these patents disclose a process for the extrusion of a silane-modified polyolefin containing a silanol condensation catalyst, with a blowing agent being injected to produce moldable foamed beads which crosslink internally when exposed to moisture.

Improved methods of producing moldable beads of foamed polymers such as polyethylenes are clearly needed, for example, methods which would not require pressure treatment or radiation.

SUMMARY OF THE INVENTION

It is an object of this invention to produce moldable expanded crosslinked polyolefin foam beads using relatively simple, inexpensive apparatus. It is also an object to be able to produce the beads economically at any desired location in any desired quantity.

In accordance with the present invention, moldable silane-crosslinked polyolefin foam beads are produced. The polyolefin is preferably selected from the group consisting of medium density polyethylene, low density polyethylene, linear low density polyethylene, polypropylene, polybutylene, and copolymers of olefin monomers having from 2 to about 8 carbon atoms, and most preferably is low density or linear low density polyethylene.

Further in accordance with the invention, moldable foam beads comprising a silane-crosslinked polyolefin foam are produced by a process comprising the steps of:

(a) mixing a composition comprising a silane-modified polyolefin and a silanol condensation catalyst in an extruder to produce a melt;

(b) injecting a blowing agent into the melt at a rate effective to produce the desired foam density in the extrudate;

(c) extruding and cutting the melt to form foam beads, and (d) exposing the foam beads to moisture to produce silane crosslinking of the polyolefin foam.

The blowing agent injected can be selected from volatile hydrocarbons, halogenated hydrocarbons and compressed inert gases. Alternatively, instead of injecting such a blowing agent in step (b), a solid blowing agent can be mixed into the composition in step (a). As an alternative to the use of silane-modified polyolefins in step (a), such raw materials can be formed in situ as the ingredients are mixed and melted by mixing effective amounts of a composition comprising at least one polyolefin with a silane compound containing at least one unsaturated group, a free radical initiator and a silanol condensation catalyst in the extruder.

Still further in accordance with the invention, processes are provided for molding solid foam articles from moldable foam beads prepared in accordance with the above processes, by the application of heat and pressure in a mold.

Further aspects and advantages of the present invention will be apparent from perusal of the following detailed description and the appended claims.

DETAILED DESCRIPTION OF THE INVENTION

In accordance with the present invention, moldable expanded crosslinked polyolefin foam beads are produced using conventional extruder apparatus having suitable means for heating and cooling, with a blowing agent injected into the polymer melt or introduced in solid form.

Crosslinking of the polyolefin resin is carried out after extrusion when the polyolefin is brought into contact with moisture. A silane-modified polyolefin resin is used, such as a polyethylene which contains carbon-bonded silyl groups. This silated or silane-grafted resin is melt mixed in the extruder with the proper amount of a silanol condensation catalyst. A plastic product made in this manner will crosslink when contacted with water, such as moisture in the atmosphere.

In making the novel beads of this invention, the silane-grafted polyolefin resin, the condensation catalyst, talc or other nucleating agent for cell size control, and any other desired additives typically are added to the hopper of an extruder. The ingredients are melted, mixed and forwarded through the extruder. At a point in the extruder where all of the ingredients are well mixed and fully melted, a blowing agent, preferably comprising a volatile organic compound, an inert gas or a mixture thereof, is injected under pressure into the molten polymer mix. The blowing agent and polymer are sufficiently mixed and cooled to the proper foaming temperature. The foamable melt is then extruded through a die plate containing a number of small holes.

The resultant foam strands are cut as they emerge from the die so that they are cut while the foam is still expanding. In this manner, beads are produced, forming substantially closed cells with a thin skin present on the entire surface of each bead. The crosslinking of the polyolefin then commences with exposure to the moisture present in the ambient atmosphere. The beads can be collected after cutting and conveyed to a suitable storage area, such as a porous bag, and held until the crosslinking reaction has proceeded to the extent that the crosslinked polyolefin beads are heat stable enough to be molded.

Using the process of the present invention, expanded, crosslinked polyolefin foam beads having densities in the range of from about 0.7 to about 10 pounds per cubic foot are produced. The beads preferably have densities in the range of from about 1.2 to about 5 pounds per cubic foot, and most preferably from about 1.5 to about 2.5 pounds per cubic foot.

The primary raw materials presently preferred for this process are silane-grafted low density polyethylene resins. Processes for the production of such resins are described in U.S. Pat. Nos. 3,646,155; 4,117,195; and 4,526,930. Generally, a silane is grafted to the base low density polyethylene resin. In an extruder or other compounding mixer, such as Brabender mixer, a free radical generator, such as dicumyl peroxide, and a silane, such as vinyltrimethoxysilane, and the base low density polyethylene resin are melt mixed. The silyl groups are grafted to the polyethylene in this way. The pendant silyl groups will form crosslinks between the polymer chains when exposed to moisture in the presence of an organometallic silanol condensation catalyst, for example an organotin ester such as dibutyl tin dilaurate.

The catalyst may be combined with the polyethylene resin, silane, and free radical generator in a second step, in which the final moisture curable product is formed. The catalyst may also be combined with the polyethylene resin, silane, and free radical generator in one extrusion or mixing step, as in the Monosil® process of The Swiss Maillefer Company. In the case of the two step process, Dow Corning's Sioplas® (U.S. Pat. No. 3,646,155) process, silane grafted polyethylene resins and a catalyst master batch, a dispersion of the catalyst in polyethylene resin, can be readily purchased. These two products are then mixed in the proper proportions and processed as desired to form a moisture curable product. Silane-grafted polyethylene resins and catalysts are also available from Synergistics Chemicals, Ltd. of Mississauga, Ontario, Canada, under the trade names Synecure® 1019-A for the silane grafted resin and Synecure® 1000-B for the catalyst master batch.

In another two-step process, a moisture-crosslinkable polyethylene such as a silane ethylene copolymer is mixed with a catalyst master-batch. Such materials are marketed by BP Performance Polymers under the trademarks SLPE® and MCA 360 ™ for the silane ethylene copolymer and catalyst master batch, respectively, and are said to offer various advantages over the use of one-step silane processes, peroxide crosslinking processes or silane grafted low density polyethylene.

The final resin/additive mixture is fed into the hopper of an extruder. At a point in the extruder where the plastic components of the resin mixture are fully melted, the blowing agent is injected. The blowing agent used is typically a hydrocarbon or chlorofluorocarbon such as butane, pentane, dichlorodifluoromethane, dichlorotetrafluoroethane, chlorodifluoromethane, or mixtures thereof. The blowing agent is injected at a rate effective to give the desired foam density, usually as about 5 to 70, preferably 10 to 40, and most preferably 25 to 40 weight percent of the total foam output rate. The proper temperature for foaming depends upon the melting point of the polymer and the type of blowing agent used, but is generally in the range of from about 175° to about 340° F., preferably from about 190° to about 240° F. when ethylene polymers are used. Hydrocarbons and halogenated hydrocarbons which are at least partially soluble in the polyolefin resins used have a plasticizing effect on the melt, reducing the frictional heat generated. Furthermore, due to the latent heat of vaporization, these materials have a cooling effect during foaming as the blowing agent vaporizes. The foaming temperature should be maintained within the desired range by the use of external cooling means in conjunction with a rate of flow of the blowing agent effective to provide additional cooling effects.

In the extruder, the resin/additive/blowing agent mixture is mixed sufficiently and cooled to the proper foaming temperature. The extruder is equipped with a die with many small holes. The foamable mixture is extruded through these holes and cut by a rapidly rotating knife which cuts the extrudate into small beads. If a cylindrical rotor containing one or more blades is used, the holes on the die are arranged in a straight line so that they can be cut by the rotor at its closest point to the die. If a propeller-type knife is used, the holes on the die are arranged in a circle so that the extrudate will be cut as the knife rotates about its center axis. Because the rate at which the foam emerges from the die is not easily controlled, the size of the beads is determined by the size of the holes on the die plate and the speed of the rotating knife.

As the beads are cut at the die face, they fall into a collection bin where they can be drawn out pneumatically or by other suitable means and conveyed to a collection area, preferably a breathable bag which will allow air to pass through fairly easily. The expanded beads in storage will crosslink through contact with the moisture contained in the air. After about three days, the crosslinking generally has proceeded enough to impart the thermal resistance to the foam beads which is needed for molding. Any additional exposure of the beads to moisture prior to molding will help accelerate crosslinking. Such exposure could include conveying the beads from the cutter using water with subsequent drying prior to bag storage or blowing moist air through the storage bag during bead storage and aging.

The silane-modified polyolefin foam should be crosslinked at least enough to make the foam beads thermally stable in the molding process. Higher proportions of crosslinking can be used to produce beads and molded objects having firmer textures. Generally, the percentage crosslinking or gel content should range from about 5 to about 85 percent, preferably from about 8 to about 60 percent as measured by ASTM D-2765.

The above described process for the manufacture of moldable crosslinked polyolefin foam beads possesses many advantages over other methods and processes used. The equipment used is relatively simple as compared to that required for the other processes. The primary equipment used is an extruder equipped with a blowing agent injection system and melt cooling capability. This type of extruder is well known to those with knowledge of polyethylene foam manufacture. The machinery which converts the foam strands to beads is a simple cutter which is very similar to those used for strand pelletizers or dicers. The crosslinking method used is silane crosslinking, in which the silane-modified polyolefin resin such as a silane-grafted polyolefin resin is processed in the same manner as a normal polyolefin. This method of crosslinking eliminates the need for a high energy radiation source for crosslinking and will give more uniform crosslinking throughout the foam in comparison to the radiation method, as radiation does not easily penetrate the relatively thick ($\frac{1}{8}''$-$\frac{1}{2}''$) foam. The beads made by this process are expanded from the extruder, which eliminates the need for large autoclave type reactors. The use of silane crosslinking eliminates the need for a preprocessing crosslinking step. The beads made in this manner do not require the pre-molding pressurizing step used in the autoclave blowing agent impregnation process.

The entire system needed to make these moldable crosslinked polyolefin beads can be installed at the molding facility and sized according to the molder's needs. Using this machinery, the molder can produce the needed quantity of beads to fill his orders. As crosslinking does require several days to take place, some storage time and space are required, but much less than the storage time and space involved with large volume shipments of expanded beads. Having the bead manufacturing equipment at the molding site eliminates the high cost associated with shipping large quantities of the bulky, low density beads. The molder has complete control over moldable bead specifications, such as density, color, additives, crosslinked level, etc., and these can be changed relatively easily.

In the production of the silane-crosslinked polyolefin foams of the present invention, silane-modified polyolefins are used, selected from homopolymers and copolymers of ethylenically-unsaturated monomers having from 2 to about 8 carbon atoms, such as ethylene, propylene, butenes, pentenes, hexenes and the like. The copolymers can include other compatible monomers, as described below. Presently, the polyethylene-type polymers are preferred, and such polymers are referred to in the disclosure and examples below, but this should be regarded as exemplary of the invention rather than limiting in any sense. Particularly preferred are the polyethylenes, including medium density polyethylene, low density polyethylene, and linear low density polyethylene. Such polyethylenes are described in the Kirk-Othmer *Encyclopedia of Chemical Technology*, Third Ed., Vol. 16, pages 385–420, the *Modern Plastics Encyclopedia* 1986–87, pages 52–63 and in the *Encyclopedia of Polymer Science and Technology*, Vol. 7, page 610.

The term "silane-modified polyethylene resin", as used in the present specification and the appended claims, denotes a modified polyethylene resin obtained by chemically bonding a silane compound containing at least one unsaturated group to a polyethylene-type resin in the presence of a radical generator, as disclosed, for example, in U.S. Pat. No. 4,160,072.

The term "polyethylene resin," as used in the present specification and the appended claims, is meant to include not only homopolymers of ethylene, but also ethylene copolymers composed of at least 50 mole percent, preferably at least 70 mole percent, of an ethylene unit and a minor proportion of a monomer copolymerizable with ethylene, and blends of at least 50 percent by weight, preferably at least 60 percent by weight, of the ethylene homopolymer or copolymer with another compatible polymer.

Examples of monomers copolymerizable with ethylene and other olefins are vinyl acetate, vinyl chloride, propylene, butene, hexene, acrylic acid and its esters, and methacrylic acid and its esters. The other polymer that can be blended with the ethylene homopolymer or copolymer may be any polymer compatible with it. Examples are polypropylene, polybutadiene, polyisoprene, polychloroprene, chlorinated polyethylene, high density polyethylenes, polyvinyl chloride, a styrene/butadiene copolymer, a vinyl acetate/ethylene copolymer, an acrylonitrile/butadiene copolymer, a vinyl chloride/vinyl acetate copolymer, etc. Especially preferred species are polypropylene, polybutadiene and styrene/butadiene copolymer.

Examples of polyethylene resins that can be advantageously employed in the present invention are low-, medium- and high-density polyethylenes, an ethylene/vinyl acetate copolymer, an ethylene/propylene copolymer, copolymers of ethylene and methyl or ethyl acrylate, a blend of polyethylene and polypropylene, a blend of polyethylene and an ethylene/vinyl acetate copolymer, and a blend of polyethylene and an ethylene/propylene copolymer. Of these, the medium density polyethylenes, low density polyethylenes, and ethylene/propylene copolymers are especially suitable.

Preferably, the polyethylene resins have a softening point of less than 130° C. Furthermore, it is preferred that the polyethylene resin have a melt index of 0.2 to 20, preferably 0.3 to 6 decigrams per minute, and a density of 0.910 to 0.940, preferably 0.916 to 0.925 grams/cc.

In the present invention, the silane-modified polyolefin resin is prepared by chemically bonding a silane compound containing at least one unsaturated group to the polyolefin resin described above in the presence of a radical generator.

The silane compounds used in this invention are organosilicon compounds containing at least one unsaturated group capable of being chemically bonded to the sites of free radicals generated in the polymer chain of the polyolefin as a result of radical reaction, for example, the silane compounds described in U.S. Pat. No. 4,160,072, and typically include organosilane compounds of the following formula:

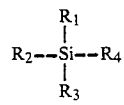

wherein one or two, preferably only one, of $R_1$, $R_2$, $R_3$ and $R_4$ represent a hydrocarbyl or hydrocarboxyl group containing a radical-polymerizable double bond, and the rest represent organic residues capable of being split off by hydrolysis.

In the above formula, examples of the hydrocarbyl group containing a radical-polymerizable double bond are vinyl, allyl, 2-methylallyl, butenyl, cyclohexenyl, cyclopentadienyl, and octadienyl, and examples of the hyrocarboxyl group containing a radical-polymerizable double bond include allyloxy and 2-methyl allyloxy. Other examples include:

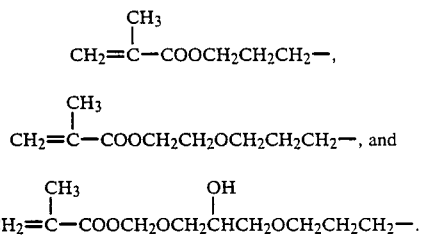

Of these, vinyl is most preferred.

Examples of the organic residues capable of being split off by hydrolysis include alkoxy groups such as methoxy, ethoxy or butoxy; acyloxy groups such as formloxy, acetoxy or propionoxy; oxime groups such as:

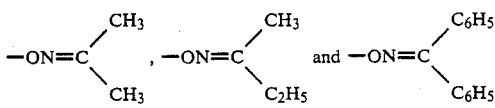

and substituted amino groups, for example, an alkyl amino or aryl amino group, such as methyl amino, ethyl amino or phenyl amino. Of these, the alkoxy groups are especially preferred.

The silane compound preferably contains three hydrolyzable organic groups.

Vinyl trimethoxysilane and vinyltriethoxysilane can be most conveniently used in the present invention.

The amount of the silane compound is not critical and can be varied widely according, for example, to the type of polyolefin resin, the desired degree of modification, and the reaction conditions. Generally, its amount is from about 0.1 to about 50 parts by weight, preferably about 0.3 to about 30 parts by weight, and most preferably about 0.5 to about 10 parts by weight, per 100 parts by weight of the polyethylene resin.

Advantageously, radical generators used in the reaction between the polyolefin resin and the silane compound are those which decompose upon heating and generate radicals. The radical generator acts as a reaction initiator at the time of chemically bonding the silane compound to the polyolefin resin. These radical generators generally have a half life of 6 minutes or less, preferably 3 minutes or less, and most preferably 1 minute or less, at the melt-kneading temperature of the polyolefin resin. Typical examples of such radical generators include organic peroxides such as benzoyl peroxide, dichlorobenzoyl peroxide, or lauroyl peroxide; organic peroxides such as t-butyl peracetate, t-butyl peroxy-2-ethyl hexanoate, or t-butyl peroxy isobutyrate, t-butyl peroxy benzoate, dicumyl peroxide, 2,5-dimethyl-2,5-di(t-butyl-peroxy)hexane, 2,5-dimethyl-2,5-di(t-butyl-peroxy)hexyne-3, di-t-butyl peroxide, 2,5-di(peroxybenzoate)hexyl-3 or 1,3-bis(t-butyl-peroxyisopropyl)benzene; and azo compounds such as azobisisobutyronitrile or dimethyl azodiisobutyrate. Dicumyl peroxide is presently most preferred.

In any situation, a specified radical generator is selected depending upon the temperature at which the polyolefin resin is reacted with the silane compound. For example, when the reaction is to be carried out at about 190° to 200° C., dicumyl peroxide, which has a half life of about 15 seconds at this temperature, is suitable. When the reaction is to be carried out at about 150° C., benzoyl peroxide, having a preferred half life at this temperature, is suitable.

The amount of the radical generator is not limited in particular, and can be varied over a wide range according, for example, to the type of the polyolefin resin used or the amount of the silane compound. Although the radical generator should be used in an amount sufficient for performing the desired degree of modification, it should not be used in amounts such that the ordinary crosslinking of the polyolefin resin becomes a main reaction mechanism. Generally, its suitable amount is 0.01 to 1.5 parts by weight, preferably 0.1 to 1 part by weight, per 100 parts by weight of the polyolefin resin.

The bonding of the silane compound to the polyolefin resin can be performed easily by the method to be described hereinbelow.

For example, the polyolefin resin, the radical generator, and the silane compound are fed into an extruder, and the radical generator is decomposed while melting the polyethylene resin, thereby chemically bonding the silane compound to the polyethylene resin.

All silanol condensation catalysts which are usually employed to form a crosslinkage in silane-modified polyolefin resins are feasible as the silanol condensation catalyst in this invention. Examples of the silanol condensation catalyst are organometallic compounds such as organotin compounds (e.g., esters such as dibutyltin dilaurate, stannous acetate, and stannous octanoate or stannous caprylate), lead naphthenate, zinc caprylate, iron 2-ethylhexanoate, cobalt naphthenate, and titanic acid esters and titanium chelate compounds [e.g., tetrabutyl titanate, tetranonyl titanate, or bis-(acetylacetonitrile)diisopropyl titanate]; organic bases such as ethylamine, hexylamine, dibutylamine or pyridine; acids such as inorganic acids (e.g., hydrochloric acid and phosphoric acid) and fatty acids (e.g., stearic acid, linoleic acid and octylic acid), and their metal salts. These catalyst compounds can be used either alone or as mixtures. Zinc salts of higher carboxylic acids can be used, such as zinc salts of aliphatic or alicyclic carboxylic acids containing 8 to 20 carbon atoms, preferably 8 to 17 carbon atoms. Examples of these zinc salts include zinc stearate, zinc octanoate, zinc laurate, and zinc naphthenate, with zinc stearate preferred. These higher carboxylic acid zinc salts may be mixed with a minor amount of another silanol condensation catalyst of the above-exemplified species, for example, organotin compounds such as dibutyltin dilaurate, dibutyltin maleate or dibutyltin diacetate. The amount of the other silanol catalyst in the mixture should be minimized, and preferably limited to not more than 5 percent based on the total weight of the mixed silanol catalyst.

The amount of the silanol condensation catalyst can be varied according to the type and amount of the silane compound bonded to the modified polyolefin resin. Generally, its amount is at least about 0.01 parts by weight, preferably 0.1 to 20 parts by weight, and most preferably 0.5 to 10 parts by weight, per 100 parts by weight of the silane-modified polyolefin resin.

The blowing agent used in the method of this invention is preferably a volatile organic blowing agent, preferably a hydrocarbon or halogenated hydrocarbon, or a compressed inert gas. Examples of the former include propane, butane, pentane, methyl chloride, trichlorofluoromethane, chlorodifluoromethane, dichlorodifluoromethane, and 1,2-dichlorotetrafluoroethane; and examples of the latter include physical blowing agents such as carbon dioxide, nitrous oxide and nitrogen, which are suitable for accomplishing the extent of foaming greater than 10 times. Suitable halogenated hydrocarbons can be obtained commercially from Du Pont of Wilmington, Del. as FREON ® fluorocarbons, and from Allied Chemical of Morristown, N.J. under the GENETRON ® Trademark. Preferred fluorocarbons for use in the present invention include FREON ® or GENETRON ® 12, 22 and 114. The numbers correspond to the chlorofluorocarbon (CFC) numbers known in the art. Butane is presently the most preferred hydrocarbon, due to its vapor pressure and solubility in polyolefin resins. Volatile organic blowing agents which are substantially soluble in the polyolefin resin to be processed are particularly preferred, as they produce finer, better distributed bubbles.

Although the introduction of a volatile organic or gaseous blowing agent into the polymer melt is presently preferred, it is also possible to use solid chemical blowing agents by introducing them into the hopper of the mixture with the polymer particles and other materials. Suitable solid chemical blowing agents include azo compounds such as azodicarbonamide, mixtures of sodium bicarbonate and citric acid, gypsum, various hydrated aluminas such as aluminum trihydrate, sodium borohydrate and the like.

The molding of these beads can be performed in several ways. The beads can be fed to a mold with at least one movable side which can compress the beads where they are subjected to a heat source, such as pressurized steam. Once the polyolefin comprising the beads is softened enough that it will fuse with itself, the compressible wall (walls) of the mold moves to compress the beads together, causing the beads to fuse together and conform to the shape of the mold. Using a similar method, the beads are placed in a container adjacent to the mold and this container is pressurized with a compressed gas, such as air, causing the volume of the beads to decrease. The beads are then transferred in this compressed state to the mold, which is also pressurized to generally the same pressure. The mold containing these compressed crosslinked polyolefin beads is closed and injected with pressurized steam to heat the beads to the temperature where the polyolefin will fuse. The pressure is released from the mold and the beads re-expanded back to their equilibrium volume. As the fusible beads re-expand, they fuse into one part with very little void space within. In another method, known as the "crush-fill" method, beads are used to fill a mold, then compressed into the molding spaces as by movement of at least one wall of the mold, and steam is injected at a suitable pressure for a time sufficient to soften and fuse the beads. Steam pressures ranging from about 5 to 60 psig can be used and maintained for times ranging from about 1 to 15 seconds. Upon release of both physical and steam pressure, the beads are molded into a fused foam object in the desired shape. The use of steam in these molding methods facilitates the initial crosslinking and fusing of the foam beads.

Once the molded objects are removed from the mold and cooled, their properties can optionally be improved by annealing, i.e. heating in an oven for an effective period of time at an effective temperature to stabilize the size and shape of the molded objects. Generally, if there has been shrinkage of the molded parts, the parts will expand slightly during annealing so as to restore the part's proper size and shape, at the same time reducing the density of the molded foam. Temperatures ranging from about 100° to about 200° F., preferably from about 140° to about 180° F., can be used. Depending upon the temperature used and the amount of annealing required, annealing times ranging from about 2 to about 48 hours, preferably from about 4 to about 24 hours, can be employed.

A great advantage of this process for the manufacture of moldable crosslinked polyolefin foam beads is that commercially available raw materials and relatively simple and inexpensive equipment are utilized. In this respect, a small crosslinked polyolefin foam bead facility may be set up at the molding site, thereby eliminating the high cost of shipping the bulky foam beads. Another advantage is that the molder need manufacture only as much material for molding as presently required, eliminating the large storage areas typically required for the storage of large bulk shipments. The molder may manufacture the beads to the specifications required as needed, such as density, color, etc. This process does not require the use of an autoclave-type pressure reactor for the manufacture of moldable polyolefins, nor does it utilize a pre-molding pressurizing step to impart expandability to the beads. This process does not require the use of a high energy radiation source for crosslinking. The degree of crosslinking throughout the beads will be more consistent using silane crosslinkages as the crosslinking sites are well dispersed throughout the polyolefin in the extruder while, with the use of radiation crosslinking, the effect tends to penetrate just slightly below the surface and not throughout the whole foam particle. The use of high energy radiation, such as electron beams or X-rays, also requires certain safety precautions to be observed, which makes this method of crosslinking disadvantageous.

If desired, the composition of this invention can contain conventional additives such as coloring agents, nucleating agents, lubricants, fire retardants, fillers, foaming aids, anti-static agents and deterioration inhibitors of suitable types in the amounts usually employed in the art.

EXAMPLES

The following Examples serve to give specific illustrations of the practice of this invention but they are not intended in any way to act to limit the scope of this invention. The numbered examples represent the present invention. The lettered examples do not represent the present invention and are for comparison purposes.

The following designations used in the examples and elsewhere in the present application have the following meanings:

| ABBREVIATION | DEFINITION |
|---|---|
| pcf | pounds per cubic foot |
| rpm | revolutions per minute |
| °F. | temperature, Farenheit degrees |
| dg/min. | melt index, decigrams per minute |
| g/cc | density, grams per cubic centimeter |
| L/D | length to diameter ratio |
| CFC | chlorofluorocarbon, any of the commercially available organic compounds containing at least one carbon atom, fluorine and chlorine |
| " | inches |
| psig | pounds per square inch, gage |
| g, gm | grams |
| hrs. | hours |
| min. | minutes |

EXAMPLE 1 and COMPARATIVE EXAMPLE A

This example illustrates the production of crosslinked polyethylene foam. The raw material resin, a silane-grafted polyethylene, was melted in an extruder having heating and cooling means into which a blowing agent (a refrigerant such as a halogenated hydrocarbon or hydrocarbon such as butane) was injected. These components were mixed and cooled to the proper foaming temperature (220° F.), as extruded from the die. Strands of foam were extruded from the extruder through a flat die with a row of round holes of the desired size and separation. These strands were cut immediately adjacent to the die by a rapidly rotating rotor with eight blades. The size of the cut beads depended upon the speed of the cutter and upon the speed with which the strands are coming from the die. By changing the speed of the cutter, the size of the beads could be regulated.

It was found that the extruded polyethylene must be crosslinked in order to be moldable into an acceptable product. The method of crosslinking used was silane crosslinking, using commercially available silane-grafted polyethylenes and a silanol condensation catalyst. These materials were processed in the same manner as a normal polyethylene and the resulting products formed crosslink upon exposure to moisture. The foam must be crosslinked so that it does not collapse when exposed to pressurized steam during molding. Several suppliers of the moisture curable, silane-crosslinked polyethylene compounds have been found and these products are manufactured using the technology described in U.S. Pat. No. 3,646,166.

The crosslinked polyethylene beads produced had a diameter of approximately ⅜" and a density of approximately 2.2 pcf. Beads of smaller diameters could be produced through the use of smaller holes and faster cutter speed.

In Example 1, some of the crosslinked beads were molded using two methods. First a bowl was filled loosely with some one-week old crosslinked beads and put in an oven at 250° F. After 20 minutes, the beads were compressed by a tight-fitting top and held in the oven at 250° F. for an additional 20 minutes. After removal from the bowl and cooling, the product obtained had a final density of 4 pcf and the beads were fused together throughout the part. Second, some of these same beads were fed to a steam-chest mold, such as used for expanded polystyrene bead molding. In the initial trials of steam-chest molding, the product was either collapsed or not totally fused, apparently due to poor mold filling.

In Comparative Example A, ⅜" diameter foam beads made from non-silane-grafted polyethylene (and thus uncrosslinked) were placed in the same bowl in a 250° F. oven for molding. After a short time, however, the beads collapsed by about 90 percent, indicating that such uncrosslinked polyethylene foam is not thermally stable enough for molding.

EXAMPLE 2

This example illustrates the production of moldable foam beads of a crosslinked polyethylene. A low density polyethylene resin grafted with silicon tetrahydride, having a melt index of 2.5 dg/min. and a density of 0.918 g/cc, was used as the base resin. Ninety-five (95) parts of this resin was tumble-mixed with 5 parts of a polyethylene concentrate containing the proper amount of a silanol condensation catalyst. Both of these products were obtained from BP Performance Polymers, Inc., and have the trade names Siocure® PE-1102 (base resin) and PE-1104 (proprietary catalyst-containing master batch). A very small amount (less than 0.1%) of talc was added to the resin mix at the hopper as a nucleating agent.

This mixture was fed into a 3" extruder having a 48:1 L/D ratio at a rate of 80 pounds per hour. An 80:20 (by weight) mixture of bis-dichlorotetrafluoroethane and dichlorodifluoromethane was pumped into the extruder at an intermediate point at a rate of 20 percent by weight based on the weight of the resin. The molten mixture was blended until the blowing agent was fully dissolved in the resin. The temperature at this point was 350° F. This mixture was forwarded to the end of the extruder and cooled to approximately 220° F. The melt then passed through a static mixer having an inside diameter of 3½" and a length of 20". The static mixer chamber was held at a temperature of 220° F. The melt was then extruded through a flat die plate containing 8 holes of 0.063" diameter arranged in a straight horizontal line.

A cutter consisting of a 4" diameter rotor with 8 horizontal blades rotating at approximately 650 rpm cut the extrudate into beads at the die. The cut beads fell into a collection bin and were drawn to a storage bag through a suction blower. The beads produced were oval in shape, measuring about ⅜" by ¼" diameter and a skin was present on the entire surface of each bead. The beads had a density of 2.2 pcf. The beads were stored at ambient conditions for three days, after which crosslinking had proceeded to a great enough extent to impart the needed heat resistance for molding. Some of the beads were molded into a foam product by heating and compression.

HYPOTHETICAL EXAMPLE 3

Moldable polyethylene foam beads are prepared from the base materials of EXAMPLE 2, using a solid blowing agent rather than the volatile organic blowing agent of EXAMPLE 2. Using a similar extruder, the same silicon-grafted polyethylene resin and catalyst master batch as employed in EXAMPLE 2 are tumble-mixed with a quantity of a solid chemical blowing agent such as azodicarbonamide sufficient to generate gases (in this case, nitrogen) equivalent to approximately 20 weight percent of the total resin mixture. Due to the presence of the solid particles of blowing agent, additional nucleating agents need not be used. The mixture is heated and fed through the extruder as in EXAMPLE 2, with the molten mixture reaching equivalent temperatures. No additional blowing agent is introduced during the mixing, but the elevated temperatures cause the azodicarbonamide or other blowing agent to release a gas, which causes the molten polymer mixture to foam upon emerging from the extruder die plate. Provided the initial tumble-mixing and the mixing in the extruder itself are sufficiently thorough, a more homogeneous distribution of the gas bubbles which cause foaming can be obtained than if nitrogen or another inert gas were injected directly into the extruder barrel to be mixed with the molten polymer.

The extruded foam product is cut and processed as in EXAMPLE 2, producing crosslinked foam beads with molding properties equivalent to those produced by injection of gaseous or volatile organic blowing agents into the extruder barrel.

EXAMPLE 4 and COMPARATIVE EXAMPLE B

These examples illustrate the molding of objects from moldable foam beads of a silane-crosslinked polyethylene in a mold whose volume can be altered during molding (a "crush-fill mold"), and to compare the performance of crosslinked polyethylene foam beads with similar foam beads which are not crosslinked in steam chest molding.

Silane-crosslinked beads were produced by a procedure similar to that of EXAMPLE 2, using the same base resin (a low density polyethylene resin grafted with silicon tetrahydride) and master batch containing the silanol condensation catalyst. Foam beads were also produced from an uncrosslinked resin using a low density polyethylene having a melt index of 2.6 and a density of 0.918 g/cc obtained under the trade name Norchem® 957 from Enron Chemical Co., recently acquired by U.S. Industrial Chemicals. The blowing agent in each case was a 20:80 blend (by weight) of commercial chlorofluorocarbons (CFC) 12 and 114. CFC 12 is essentially dichlorodifluoromethane and CFC 114 is essentially bis-dichlorotetrafluoroethane. The gel content of the crosslinked polyethylene was 81.8 percent, as tested by ASTM D-2765.

The mold employed in the trials contained a volume of approximately 25 cubic inches, and could be opened or closed during molding to alter the volume. If the mold was opened to the extent that the opening at the seam exceeded about ⅜" (i.e., about the diameter of the foam beads), beads would escape from the mold through the seam opening and the mold could not be filled properly. Thus, the volume decrease during molding was limited to about 10 percent.

Molding was carried out by charging beads to the mold and applying steam pressure. Steam pressures ranging from about 30 to about 65 psig were used, with molding times ranging from about 1 to 12 seconds. If a high enough steam pressure was used for sufficient time (generally at least 30 psig for 12 seconds), the beads were forced together and fused to conform to the shape of the mold. If lower steam pressures than 30 psig were used, the beads did not totally fuse together. One portion of the mold was found to be too narrow in that the beads did not easily fill the area, but this condition could be remedied by using smaller beads or a less constricted mold.

Several molded objects were produced using this mold and the crosslinked foam beads, with the densities of the molded objects ranging from 2.6 to 2.7 pcf. The foam beads in the molded objects were fused together very well, as indicated by the fact that when the parts were ripped, beads fractured along about 75 percent of the fracture line, while intact beads separated along only about 25 percent of the fracture line.

The molded objects were found to shrink slightly when removed from the mold and cooled. After such cooling, one part (original density 2.67 pcf) was placed in an oven at 140° F. for 24 hours. When removed from the oven, its mass had decreased by 6.4 percent, its volume had increased by 29.2 percent, and the new density was 1.90 pcf. After another 24 hours in the oven at the same temperature, the part's mass was unchanged, but the volume increased by another 4.3 percent, giving a new density of 1.83 pcf. The densities of the parts oven-heated after molding were all less than the density of the unmolded beads (2.3 pcf) and the density of the molded, cooled part.

For Comparative Example B, the uncrosslinked polyethylene beads as described above were molded in the same manner as the crosslinked beads. When the mold was opened, the foam beads were shrunken and collapsed, and hardly fused, indicating that some crosslinking is needed for successful molding of such foams. The degree of crosslinking can be controlled by the amount of the silane crosslinking agent and catalyst used to produce the crosslinked resin, but if desired non-crosslinked resins can also be blended with the crosslinked material prior to extrusion and foaming.

EXAMPLE 5

This example illustrates the molding of objects from crosslinked polyolefin foam beads in a "crush-fill" mold and the effects of annealing upon the molded parts.

Foam beads prepared as in EXAMPLE 2 were used in a mold in which the volume could be reduced as much as approximately one third by moving one mold wall inward. The beads were fed to the mold and then subjected to steam under pressure for a time effective to soften and fuse the beads (e.g., about 45 psig for 8 seconds). The mold wall was then moved inward to reduce the volume to about two thirds the original volume, and water was passed through the mold cooling jacket for cooling. The mold was then opened completely and the molded parts removed. The parts collapsed or shrank somewhat as they cooled. The cooled molded parts were then placed in an air circulating oven at 165° F. for varying periods of time. During this heating process, the parts expanded back to the original shape and size of the mold. In addition to increasing the volume of the molded part, this "annealing" also seemed to drive off moisture left in the part from the molding step. All the parts molded and annealed retained the shape of the mold, and the foam beads were fused together well. Table 1 below summarizes the processing and properties of the molded foam parts made.

TABLE 1

| Trial | Orig. Vol. (cu. ft.) | Orig. Wt. gm | Final Vol. (cu. ft.) | Final Wt. (gm) | Time in Oven (hrs.) | Final Density (pcf) |
|---|---|---|---|---|---|---|
| 1 | .032 | 42.00 | .037 | 34.48 | 5 | 2.06 |
| 2 | * | * | .040 | 36.40 | 5 | 2.00 |
| 3 | * | * | .037 | 33.55 | 5 | 2.00 |
| 4 | * | * | .035 | 28.71 | 16 | 1.80 |
| 5 | * | * | .038 | 32.84 | 16 | 1.89 |

*Not measured

The above examples illustrate that crosslinked polyethylene foam beads suitable for molding can be produced by the extrusion of polyethylene-type resins containing blowing agents, each as described above in the specification. However, these examples should not be considered as limiting the scope of the present invention, which is limited only by the appended claims.

We claim:

1. Moldable extrusion-foamed silane-crosslinked polyolefin foam beads.

2. Moldable foam beads in accordance with claim 1, wherein said polyolefin is selected from the group consisting of medium density polyethylene, low density polyethylene, linear low density polyethylene, polypropylene, polybutylene, and homopolymers and copolymers comprising olefin monomers having from 2 to about 8 carbon atoms.

3. Moldable foam beads in accordance with claim 1, wherein said polyolefin is low density polyethylene or linear low density polyethylene.

4. Moldable foam beads in accordance with claim 1, produced by foaming with a blowing agent.

5. Moldable foam beads in accordance with claim 4, wherein said blowing agent is a volatile organic agent selected from the group consisting of hydrocarbons and halogenated hydrocarbons.

6. Moldable foam beads in accordance with claim 4, wherein said blowing agent is an inert gas.

7. Moldable foam beads in accordance with claim 4, wherein said blowing agent is a solid material which decomposes to form a gas.

8. Moldable foam beads in accordance with claim 1, wherein the silane crosslinking is produced by exposure of the foam beads to moisture and the foam comprises a silanol condensation catalyst.

9. Moldable foam beads comprising a silane-crosslinked polyolefin foam, produced by a process comprising the steps of:
   (a) mixing a composition comprising a silane-modified polyolefin and a silanol condensation catalyst in an extruder to produce a melt;
   (b) injecting a blowing agent into said melt at and rate effective to produce the desired foam density in the extrudate;
   (c) extruding and cutting said melt to foam said foams beads, and
   (d) exposing said foam beads to moisture to produce silane crosslinking of the polyolefin foam.

10. Moldable foam beads comprising a silane-crosslinked polyolefin foam, produced by a process comprising the steps of:
   (a) mixing a composition comprising a silane-modified polyolefin, a silanol condensation catalyst and a solid blowing agent in an extruder to produce a melt;
   (b) heating said melt to and temperature effective to activate said blowing agent;
   (c) maintaining the temperature of said melt at an acceptable foaming temperature at the die of said extruder;
   (d) extruder a cutting said melt to form said foam beads; and
   (e) exposing said foam beads to moisture to produce silane-crosslinking of the polyolefin foam.

11. Moldable foam beads formed of a silane-crosslinked polyolefin foam produced by a process comprising the steps of:
   (a) mixing a composition comprising a silane-grafted low density polyethylene and a silane condensation catalyst selected from the group consisting or organotin esters in an extruder to form a melt;
   (b) injecting a hydrocarbon or halogenated hydrocarbon blowing agent into said melt at a rate effective to cool said melt to foaming temperature and produce an extruded foam product having a density in the range of from about 1.5 to about 2.5 pcf;
   (c) extruding and cutting said melt to form said foam beads, and
   (d) exposing said foam beads to moist ambient air to produce substantially homogeneous silane crosslinking of the polyethylene foam.

12. Moldable foam beads in accordance with claim 9 wherein said polyolefin is selected from the group consisting of medium density polyethylene, low density polyethylene, linear low density polyethylene, polypropylene, polybutylene, and copolymers comprising olefin monomers having from 2 to about 8 carbon atoms.

13. Moldable foam beads in accordance with claim 9 wherein said polyolefin is low density polyethylene or linear low density polyethylene.

14. Moldable foam beads in accordance with claim 9 wherein said polyolefin is low density polyethylene having a density of about 0.917 to 0.923 g/cc.

15. Moldable foam beads in accordance with claim 9 wherein said blowing agent is a volatile organic agent selected from the group consisting of hydrocarbons and halogenated hydrocarbons.

16. Moldable foam beads in accordance with claim 9 wherein said polyolefin foam is crosslinked by silane groups upon exposure to the silanol condensation catalyst in said foam to moisture after said beads are extruder and cut.

17. Moldable foam beads in accordance with claim 9 wherein said polyolefin foam is crosslinked to the extent that said beads are heat stable enough to be molded by application of heat and pressure.

18. Moldable foam beads in accordance with claim 9 wherein the rate of injection of said blowing agent into said melt is effective to produce foam beads having a density in the range of from about 0.7 to about 10 pcf after exposure to moisture.

19. Moldable foam beads in accordance with claim 8 wherein the density is in the range of from about 1.2 to 5 pcf.

20. Moldable silane-crosslinked polyolefin foam beads comprising low density or linear low density polyethylene, produced by extrusion foaming with a blowing agent selected from the group consisting a hydrocarbons and halogenated hydrocarbons, wherein said foam comprises a silanol condensation catalyst and the silane crosslinking is produced by exposure of said foam beads to moisture, the density of said foam thereafter being in the range of from about 1.2 to about 5 pcf and said foam being crosslinked to the extent that said beads are heat stable enough to be molded by application of heat and pressure.

* * * * *

UNITED STATES PATENT AND TRADEMARK OFFICE
CERTIFICATE OF CORRECTION

PATENT NO. : 4,870,111

DATED : September 26, 1989

INVENTOR(S) : Thomas M. Pontiff, et al.

It is certified that error appears in the above-identified patent and that said Letters Patent is hereby corrected as shown below:

On the title page, under item [19] and in item [75], "Donuiff" should read --Pontiff--.

Signed and Sealed this

Twentieth Day of February, 1990

Attest:

JEFFREY M. SAMUELS

Attesting Officer     Acting Commissioner of Patents and Trademarks